United States Patent
Lee et al.

(10) Patent No.: US 12,069,791 B2
(45) Date of Patent: Aug. 20, 2024

(54) TURNTABLE SYSTEM FOR HYBRID COOKING APPLIANCE WITH MICROWAVE AND INDUCTION HEATING FEATURES

(71) Applicant: Haier US Appliance Solutions, Inc., Wilmington, DE (US)

(72) Inventors: Byung Cheon Lee, Seongnam-si (KR); Youngjin Oh, Seoul (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 294 days.

(21) Appl. No.: 17/356,947

(22) Filed: Jun. 24, 2021

(65) Prior Publication Data
US 2022/0418056 A1    Dec. 29, 2022

(51) Int. Cl.
*H05B 6/64* (2006.01)
*H05B 6/12* (2006.01)

(52) U.S. Cl.
CPC .......... *H05B 6/6488* (2013.01); *H05B 6/129* (2013.01); *H05B 6/6411* (2013.01)

(58) Field of Classification Search
CPC .... H05B 6/129; H05B 6/6411; H05B 6/6408; H05B 6/642; H05B 6/6464; H05B 6/647; H05B 6/6473; H05B 6/6485; H05B 6/6488; H05B 6/72; H05B 6/725; H05B 6/74; H05B 6/76; H05B 6/766; Y02B 40/00

See application file for complete search history.

(56) References Cited

U.S. PATENT DOCUMENTS

| | | | |
|---|---|---|---|
| 4,254,319 A | 3/1981 | Beh | |
| 4,501,944 A * | 2/1985 | Matsushima | H05B 6/72 219/754 |
| 5,177,333 A | 1/1993 | Ogasawara | |
| 5,371,343 A * | 12/1994 | Yoshimura | H05B 6/6411 219/754 |
| 5,698,125 A | 12/1997 | Kwon | |
| 6,864,468 B2 * | 3/2005 | Kim | H05B 6/6482 219/601 |
| 6,987,252 B2 | 1/2006 | Goodrich | |
| 8,253,084 B2 | 8/2012 | Iwamoto | |
| 2020/0029402 A1 * | 1/2020 | Chen | H05B 6/6411 |
| 2021/0235555 A1 * | 7/2021 | Lim | H05B 6/6411 |
| 2021/0267026 A1 * | 8/2021 | Kim | H05B 6/6402 |

FOREIGN PATENT DOCUMENTS

| | | | |
|---|---|---|---|
| JP | 2-124410 U | * | 12/1990 |
| JP | 2011202870 A | * | 10/2011 |
| WO | WO2004091260 A1 | | 10/2004 |

* cited by examiner

*Primary Examiner* — Hung D Nguyen
(74) *Attorney, Agent, or Firm* — Dority & Manning, P.A.

(57) ABSTRACT

A cooking appliance includes a cabinet that defines a cooking chamber. A magnetron is mounted within the cabinet and is in communication with the cooking chamber to direct a microwave thereto. An induction heating coil is mounted within the cabinet and is in communication with the cooking chamber to direct a magnetic field thereto. A turntable is rotatably mounted in the cooking chamber above the induction heating coil. A motor is operatively coupled to the turntable and is mounted within the cabinet outside of the cooking chamber below and adjacent to the induction heating coil. The motor is operatively coupled to the turntable by a non-magnetic rotation hub extending through the induction heating coil.

18 Claims, 9 Drawing Sheets

TURNTABLE SYSTEM FOR HYBRID COOKING APPLIANCE WITH MICROWAVE AND INDUCTION HEATING FEATURES

FIELD OF THE INVENTION

The present subject matter relates generally to cooking appliances, and more particularly to cooking appliances having features for microwave and induction heating in a common cavity.

BACKGROUND OF THE INVENTION

Over the past several decades, microwave cooking appliances (i.e., microwave appliances) have become a staple appliance for many, if not most, kitchens. Generally, microwave appliances include a cabinet that defines a cooking chamber for receipt of food items for cooking. In order to provide selective access to the cooking chamber and to contain food items and cooking energy (e.g., microwaves) during a cooking operation, a door is further included that is typically pivotally mounted to the cabinet. During use, a magnetron can generate the microwave radiation or microwaves that are directed specifically to the cooking chamber. The microwave radiation is typically able to heat and cook food items within the cooking chamber faster than would be possible with conventional cooking methods using direct or indirect heating methods. Moreover, since microwave appliances are often smaller than other appliances (e.g., a conventional baking oven) within a kitchen, microwave appliances are often preferable for heating relatively small portions or amounts of food.

In spite of the advantages provided by typical microwave appliances, there can be instances where other cooking methods are preferable (e.g., separate from or in addition to microwave cooking, such as in order to heat a specific food item slowly or evenly). Induction cooking, for example, is especially popular since it offers direct heating of a cooking vessel. Generally, for induction cooking, an induction coil produces a high frequency magnetic field, which can cause eddy currents to flow through a cooking vessel made of steel or stainless steel, and thereby heats the foods by the Joule heat produced in the cooking vessel.

Previous attempts have been made to incorporate an induction coil within the same structure as a magnetron or microwave appliance. Nonetheless, such attempts have largely been unable to adequately shield the induction coil from microwave radiation or microwaves while still permitting a magnetic field at a suitable strength from the induction coil. Additionally, such attempts have encountered difficulty with accommodating both the induction coil and a turntable motor within the same structure.

As a result, it would be advantageous to provide a cooking appliance with features for both induction and microwave cooking.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a cooking appliance is provided. The cooking appliance defines a lateral direction, and a transverse direction. The vertical, lateral, and transverse directions are mutually perpendicular. The cooking appliance includes a cabinet that defines a cooking chamber. The cooking appliance also includes a magnetron mounted within the cabinet in communication with the cooking chamber to direct a microwave thereto. The cooking appliance further includes an induction heating coil mounted within the cabinet below the cooking chamber along the vertical direction. The induction heating coil is in communication with the cooking chamber to direct a magnetic field thereto. The cooking appliance also includes a turntable rotatably mounted in the cooking chamber above the induction heating coil along the vertical direction. A motor is operatively coupled to the turntable. The motor is mounted within the cabinet outside of the cooking chamber below and adjacent to the induction heating coil. The motor is operatively coupled to the turntable by a non-magnetic rotation hub extending through the induction heating coil.

In another exemplary aspect of the present disclosure, a cooking appliance is provided. The cooking appliance includes a cabinet that defines a cooking chamber. A magnetron is mounted within the cabinet and is in communication with the cooking chamber to direct a microwave thereto. An induction heating coil is mounted within the cabinet and is in communication with the cooking chamber to direct a magnetic field thereto. The cooking appliance also includes a turntable rotatably mounted in the cooking chamber above the induction heating coil. A motor is operatively coupled to the turntable. The turntable is mounted within the cabinet in the cooking chamber adjacent to the induction heating coil. A motor is operatively coupled to the turntable and is mounted within the cabinet outside of the cooking chamber adjacent to the induction heating coil on an opposite side of the induction heating coil from the turntable. The motor is operatively coupled to the turntable by a non-magnetic rotation hub extending through the induction heating coil.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. Furthermore, as used herein, terms of approximation, such as "approximately," "substantially," or "about," refer to being within a ten percent margin of error.

Figure 1:
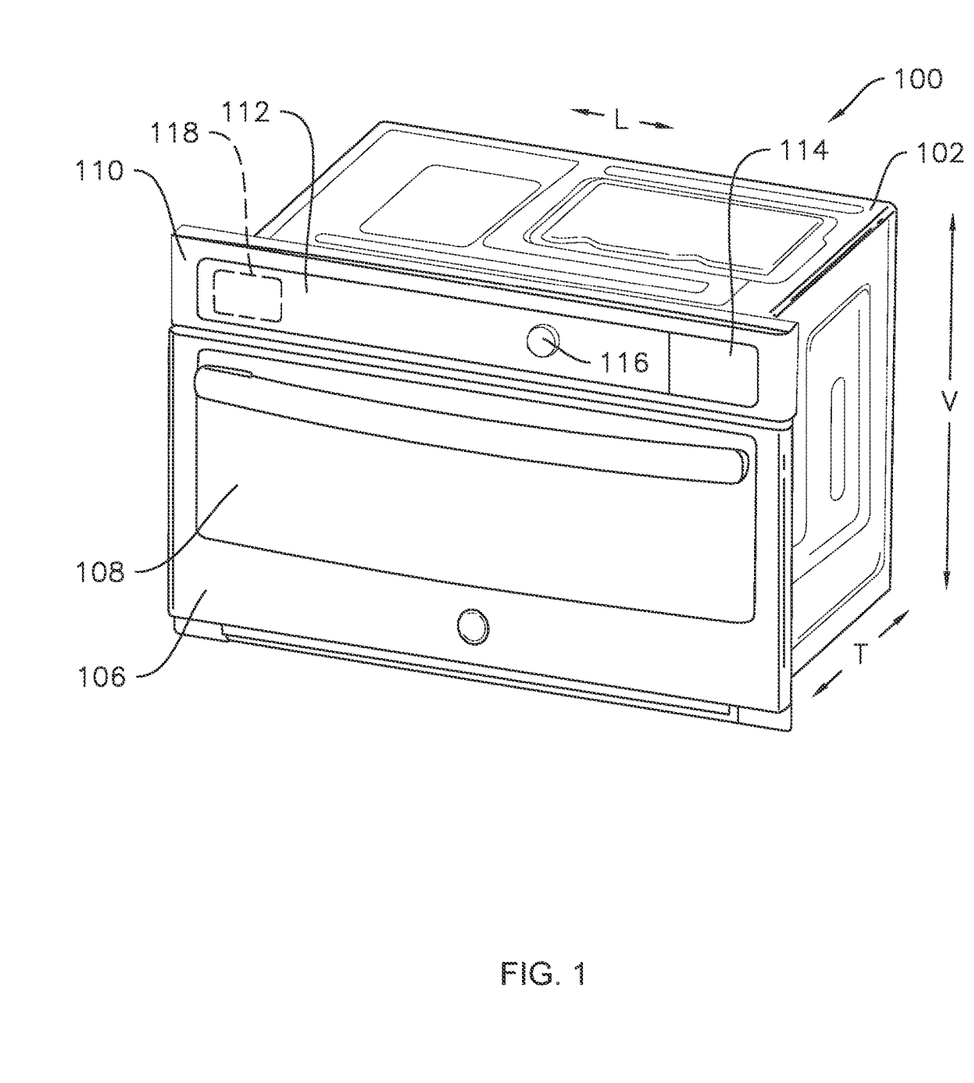
FIG. 1 provides a perspective view of a cooking appliance according to one or more exemplary embodiments of the present disclosure.
Figure 2:
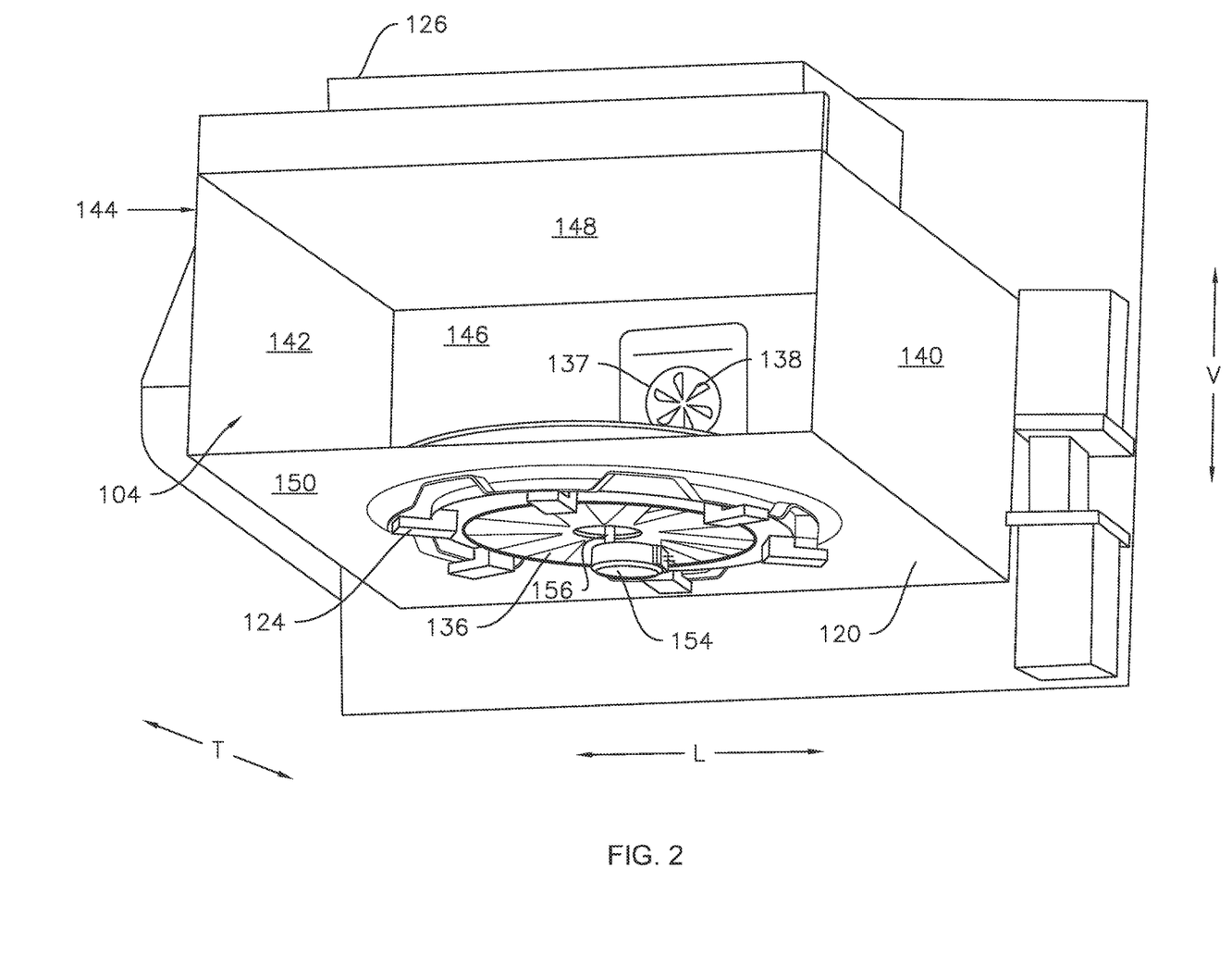
FIG. 2 provides a perspective view of the exemplary cooking appliance of FIG. 1, with a door and outer housing thereof removed to illustrate internal components of the cooking appliance.
Figure 3:
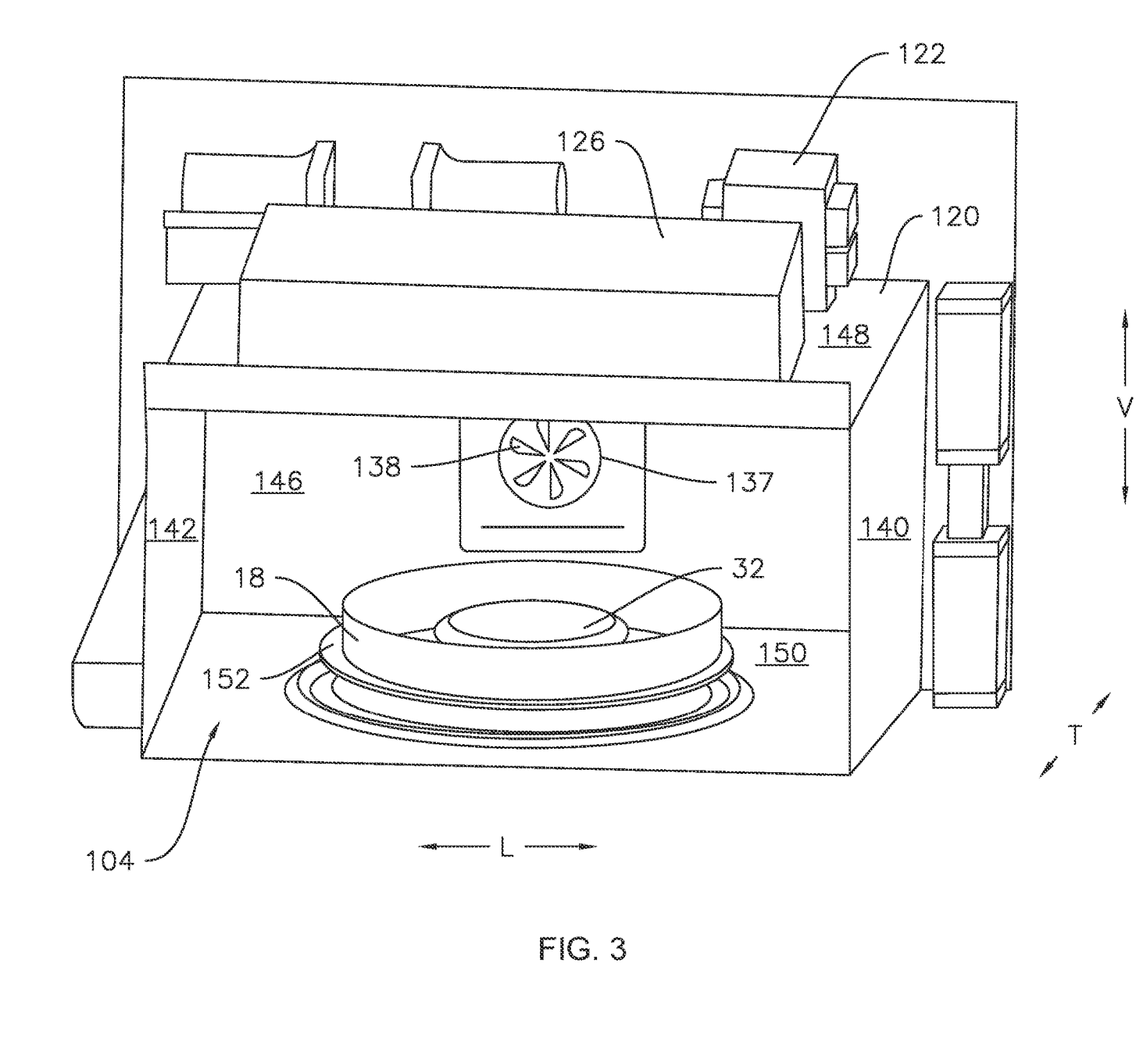
FIG. 3 provides another perspective view of the exemplary cooking appliance of FIG. 2.

Turning now to the figures, FIG. 1 provides a perspective view of a cooking appliance 100 according to exemplary embodiments of the present disclosure. FIGS. 2 and 3 provide additional perspective views of the cooking appliance 100 with the cabinet 102 and door 106 omitted to illustrate internal components of the cooking appliance 100. Generally, the cooking appliance 100 may define a vertical direction V, a lateral direction L, and a transverse direction T. The vertical direction V, the lateral direction L, and the transverse direction T may be mutually perpendicular. In particular, the cooking appliance 100 may extend between a top and a bottom along the vertical direction, between a left side and a right side along the lateral direction L, and between a front and a back along the transverse direction T. For example, "front," "back," "left," and "right" may be defined from the perspective of a user standing in front of the cooking appliance 100 to access the cooking chamber 104 therein, e.g., via the door 106. Within cabinet 102, cooking appliance 100 defines a cooking chamber 104 (FIGS. 2 and 3) in which food items can be received. In some embodiments, a door 106 is rotatably mounted to the cabinet 102 to move between an open position and a closed position. The open position permits access to cooking chamber 104 while the closed position restricts access to cooking chamber 104. A window 108 in door 106 may be provided (e.g., for viewing food items in the cooking chamber 104). Additionally or alternatively, a handle may be secured to door 106 (e.g., to rotate therewith). The handle can be formed of plastic, for example, and can be injection molded.

In certain embodiments, cooking appliance 100 includes a control panel frame 110 on or as part of cabinet 102. A control panel 112 may be mounted within control panel frame 110. Generally, control panel 112 includes a display device 114 for presenting various information to a user. Control panel 112 may also include one or more input devices (e.g., tactile buttons, knobs, touch screens, etc.). In optional embodiments, the input devices of control panel 112 include a knob or dial 116. Selections may be made by rotating dial 116 clockwise or counter-clockwise, and when the desired selection is displayed, pressing dial 116. For example, many meal cook cycles and other cooking algorithms can be preprogrammed in or loaded onto a memory device of a controller 118 of cooking appliance 100 for many different food item types (e.g., pizza, fried chicken, French fries, potatoes, etc.), including simultaneous preparation of a group of food items of different food types comprising an entire meal. Instructions or selections may be displayed on display device 114. In optional embodiments, display device 114 can be used as an input device. For instance, display device 114 may be a touchscreen device, as is understood by those of ordinary skill in the art.

In exemplary embodiments, cabinet 102 of cooking appliance 100 includes an inner shell 120. Inner shell 120 of cabinet 102 delineates the interior volume of cooking chamber 104. In particular, the inner shell 120 may comprise a plurality of walls which define and delineate the cooking chamber 104, such as a top wall 148 and a bottom wall 150 which are spaced apart along the vertical direction V, a rear wall 146 which is spaced apart from a front opening 144 along the transverse direction T, and a left wall 142 and a right wall 140 which are spaced apart from each other along the lateral direction L. Each wall of the plurality of walls 140, 142, 146, 148, and 150, may be joined to the adjoining walls at corresponding edges thereof, e.g., the bottom edge of the left wall 142 is joined to the left edge of the bottom wall 150, the bottom edge of the rear wall 146 is joined to the rear edge of the bottom wall 150 and the left edge of the rear wall 146 is joined to the rear edge of the left wall 142, and so forth. Continuing the example, the top edges of the left, right, and rear walls 142, 140, 146 may each be joined to the left, right, and rear edges, respectively, of the top wall 148, etc. Optionally, the walls of shell 120 may be constructed using high reflectivity (e.g., 72% reflectivity) stainless steel.

Thus, in at least some embodiments, the cooking chamber 104 may be defined and bounded by the plurality of walls of the inner shell 120, including the top wall 148 and bottom wall 150. As will be described in more detail below, the cooking appliance 100 may also include multiple cooking modules. For example, the cooking appliance 100 may include an upper heating module 126 at or proximate to the top wall 148 of the inner shell 120 and a lower heating module 124 at or proximate to the bottom wall 150. The top wall 148 and the bottom wall 150 may be spaced apart along the vertical direction V by a height of the cooking chamber 104. As used herein, the upper and lower heating modules 126, 124 may be "proximate to" the top wall 148 and bottom wall 150, respectively, when the heating module is spaced apart from the corresponding top wall or bottom wall along the vertical direction V by ten percent of the height of the cooking chamber 104 or less.

Cooking appliance 100 includes multiple cooking modules. In particular, cooking appliance 100 includes a microwave module 122 mounted to the inner shell 120 at the top wall 148 of the inner shell 120, a lower heater module 124 (FIG. 7) mounted within the cabinet 102, e.g., mounted to the bottom wall 150 of the inner shell 120, and an upper heater module 126 mounted within cabinet 102, e.g., mounted to the top wall 148 of the inner shell 120 above the cooking chamber 104, as illustrated in FIGS. 2 and 3.

In some embodiments, the cooking appliance 100 may also include a convection heating module, e.g., including a convection heating element 137 and convection fan 138 positioned adjacent rear wall 146 of cooking chamber 104. Convection fan 138 may be a variable speed fan—meaning the speed of fan 138 may be controlled or set anywhere between and including, e.g., zero and one hundred percent (0%-100%). In certain embodiments, oven appliance 100 may also include a bidirectional triode thyristor (not shown), i.e., a triode for alternating current (TRIAC), to regulate the operation of convection fan 138 such that the speed of fan 138 may be adjusted during operation of the cooking appliance 100. The speed of convection fan 138 can be determined by controller 118. The convection heating features are optional and are shown and described herein solely by way of example. In other embodiments the oven appliance 100 may include different convection heating features or may not include convection heating features at all.

Generally, the microwave module 122 includes a magnetron mounted within the cabinet 102 (e.g., behind cooking chamber 104 and between the inner shell 120 and the cabinet 102) and in communication (e.g., fluid or transmissive communication) with the cooking chamber 104 to direct microwave radiation or microwaves thereto. In other words, the microwave module 122 delivers microwave radiation into cooking chamber 104, as is understood by those of ordinary skill in the art. Since the structure and function of magnetrons are understood by those of ordinary skill in the art, the magnetron is only illustrated schematically and is not described in further detail herein for the sake of brevity and clarity.

Figure 7:
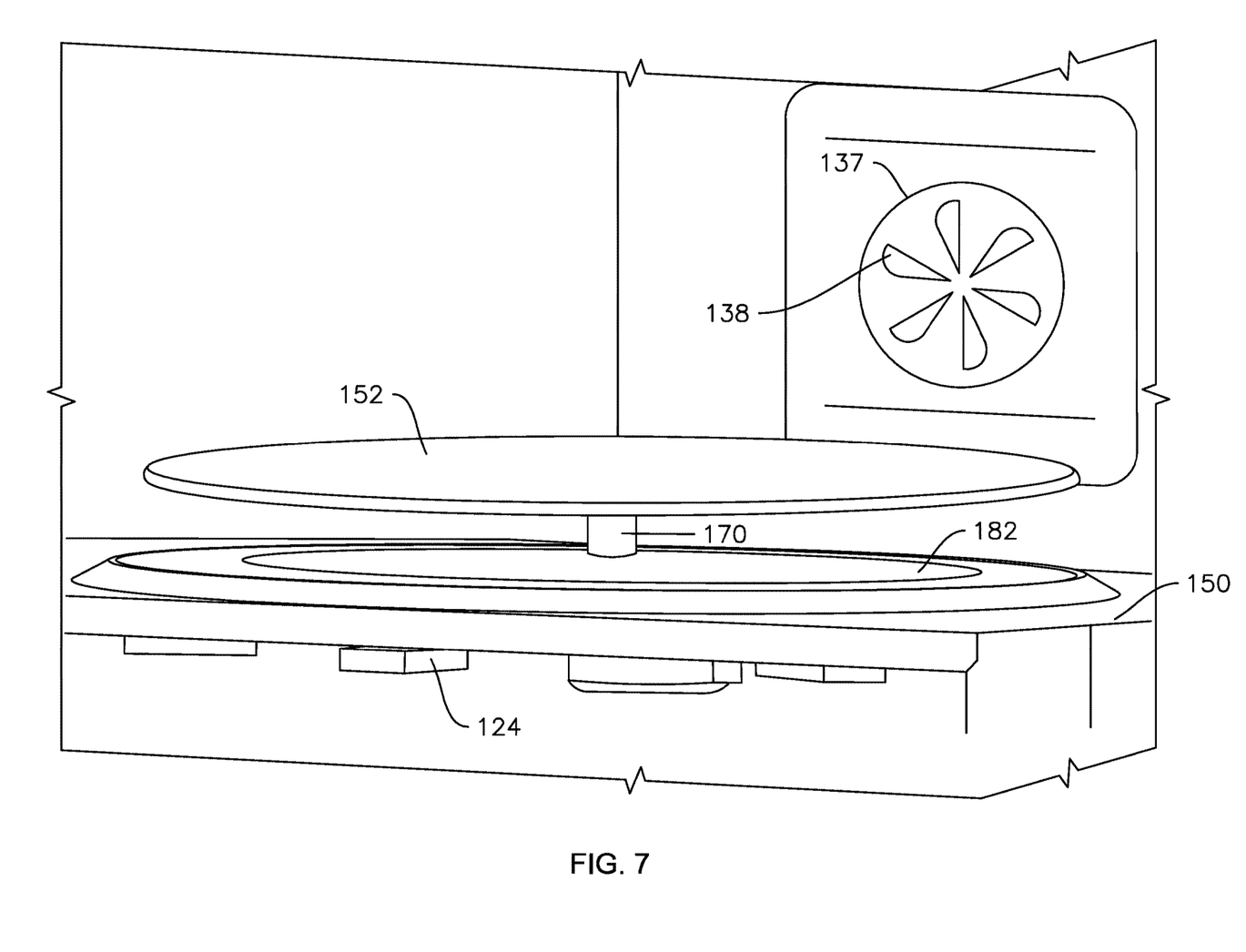
FIG. 7 provides a perspective view of a removable turntable of the exemplary cooking appliance of FIG. 2.

The lower heater module 124 may be mounted within cabinet 102. For instance, lower heater module 124 may include an induction heating coil 136 mounted below cooking chamber 104. Induction heating coil 136 may be in communication (e.g., transmissive communication) with cooking chamber 104 (e.g., through a one-way field filter 182, as illustrated in FIG. 7) to direct a magnetic field thereto. For example, the induction heating coil 136 may be or include a Lenz coil or wire. As will be understood by those skilled in the art, cooking appliance 100 can supply a current to the Lenz coil of induction heating coil 136. As such, current passes through induction heating coil 136 and the Lenz coil generates a magnetic field. The magnetic field can be a high frequency circulating magnetic field. The induction heating coil 136 can be oriented such that the magnetic field is directed towards and through bottom wall 150 to cooking utensil 18 (FIG. 3). In particular, when the magnetic field penetrates cooking utensil 18, the magnetic field from the induction heating coil 136 induces a circulating electrical current within cooking utensil 18, e.g., within a bottom wall of cooking utensil 18. The material properties of cooking utensil 18 restrict a flow of the induced electrical current and convert the induced electrical current into heat within cooking utensil 18. As cooking utensil 18 heats up, contents 32 (FIG. 3) of cooking utensil 18 contained therein heat up as well. In such a manner, induction heating element 130 can cook contents 32 of cooking utensil 18.

As shown, induction heating coil 136 may be mounted below cooking chamber 104. In particular, induction heating coil 136 may be mounted beneath the bottom wall 150 of inner shell 120. Above induction heating coil 136 (e.g., and within cooking chamber 104) a tray or platter 152 may be provided on which a food item may be supported. For induction cooking, the food item may be provided with an induction cooking vessel, e.g., vessel 18, having suitable material properties for induction cooking as is understood by those of ordinary skill in the art. Controller 118 may be configured to selectively activate induction heating coil 136 to generate a high frequency magnetic field, which may be transmitted through bottom wall 150 to the food item thereabove. Moreover, controller 118 may be configured to selectively activate upper heater module 126 (FIG. 3) to direct heat to the food item.

Upper heater module 126 can include one or more heating elements of any suitable types. For instance, upper heater module 126 can include one or more electric heating elements, such as a resistive heating element (e.g., sheathed resistive heater) or a radiant heating element (e.g., a halogen cooking lamp) in thermal communication with cooking chamber 104. In various embodiments, upper heater module 126 may be mounted within or above cooking chamber 104.

The specific heating elements of upper and lower heater modules 126 and 124 can vary from embodiment to embodiment, and the elements and system described above are exemplary only. For example, the upper heater module 126 can include any combination of heaters including combinations of halogen lamps, ceramic lamps, or sheathed heaters. Also by way of example, the lower heater module 124 may include an electric resistance heating element as well as the induction heating coil 136.

As illustrated in FIG. 1, cooking appliance 100 may include a controller 118. Controller 118 of cooking appliance 100 can include one or more processor(s) and one or more memory device(s). The processor(s) of controller 118 can be any suitable processing device, such as a microprocessor, microcontroller, integrated circuit, or other suitable processing device. The memory device(s) of controller 118 can include any suitable computing system or media, including, but not limited to, non-transitory computer-readable media, RAM, ROM, hard drives, flash drives, or other memory devices. The memory device(s) of controller 118 can store information accessible by the processor(s) of controller 118 including instructions that can be executed by the processor(s) of controller 118 in order to execute various cooking operations or cycles (e.g., a meal cook cycle). Controller 118 is communicatively coupled with various operational components of cooking appliance 100, such as components of upper heater module 126, lower heater module 124, or control panel 112 (e.g., display device 114 or dial 116), the various control buttons, etc. Input/Output ("I/O") signals may be routed between controller 118 and control panel 112 as well as other operational components of cooking appliance 100. Controller 118 can execute and control cooking appliance 100 in various cooking operations or cycles, such as precision cooking, which includes meal cook, microwave, induction, or convection/bake modes.

In some embodiments, a turntable system is further provided within cabinet 102. Generally, the turntable system may include a rotatable platter or turntable 152 driven by a motor 154 that is connected thereto. Turntable motor 154 may be communicatively coupled to controller 118 and may be any suitable motor 154 for providing rotational motivating force to the turntable 152. In some exemplary embodiments, the motor 154 may be a stepper motor. The structure and function of motors are generally understood by those of skill in the art and, as such, are not shown or described in further detail herein for the sake of brevity and clarity.

As mentioned above, the motor 154 may be operatively coupled to the turntable 152. As illustrated, e.g., in FIGS. 5 and 6, the motor 154 may be mounted within the cabinet 102 outside of the cooking chamber 104, such as between the inner shell 120 and the cabinet 102. The motor 154 may thereby be disposed adjacent to the induction heating coil 136. Further, the motor 154 may also be positioned below the induction heating coil 136, e.g., along the vertical direction V. Thus, with the motor 154 below the induction heating coil 136 and the turntable 152 above the induction heating coil 136, the coupling of the motor 154 and the turntable 152 extends through the induction heating coil 136. In order to prevent or minimize magnetic interference, the motor 154 may be operatively coupled to the turntable 152 by a non-magnetic rotation hub 170 extending through the induction heating coil 136.

As may be seen, e.g., in FIG. 2, in some embodiments, the motor 154 may be directly coupled to a drive shaft 156. Thus, the motor 154 may rotate the drive shaft 156 when the motor 154 is activated, e.g., by the controller 118, and the motor 154 may be coupled to the turntable 152 via the drive shaft 156. The motor 154 of the turntable system may be positioned outside of the cooking chamber 104, e.g., below the bottom wall 150 of the cooking chamber 104. In such embodiments, the drive shaft 156 may extend through the bottom wall 150 and the induction heating coil 136, such as through an aperture 186 (FIG. 6) in the induction heating coil 136, such as in the center of the induction heating coil 136, e.g., where the induction heating coil encircles or wraps around the aperture 186.

Figure 4:
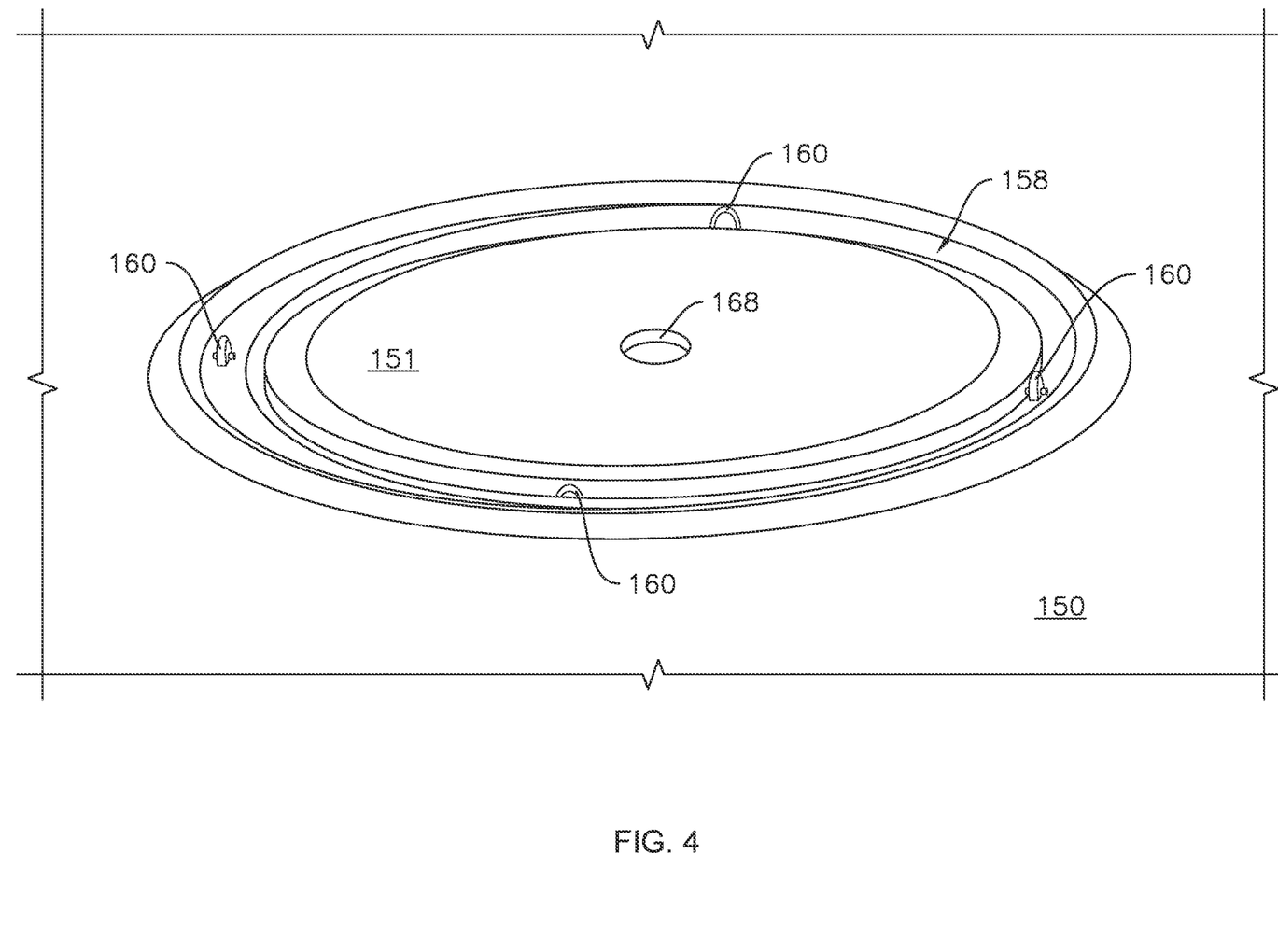
FIG. 4 provides an enlarged perspective view of a bottom portion of a cooking chamber in the exemplary cooking appliance of FIG. 2.
Figure 5:
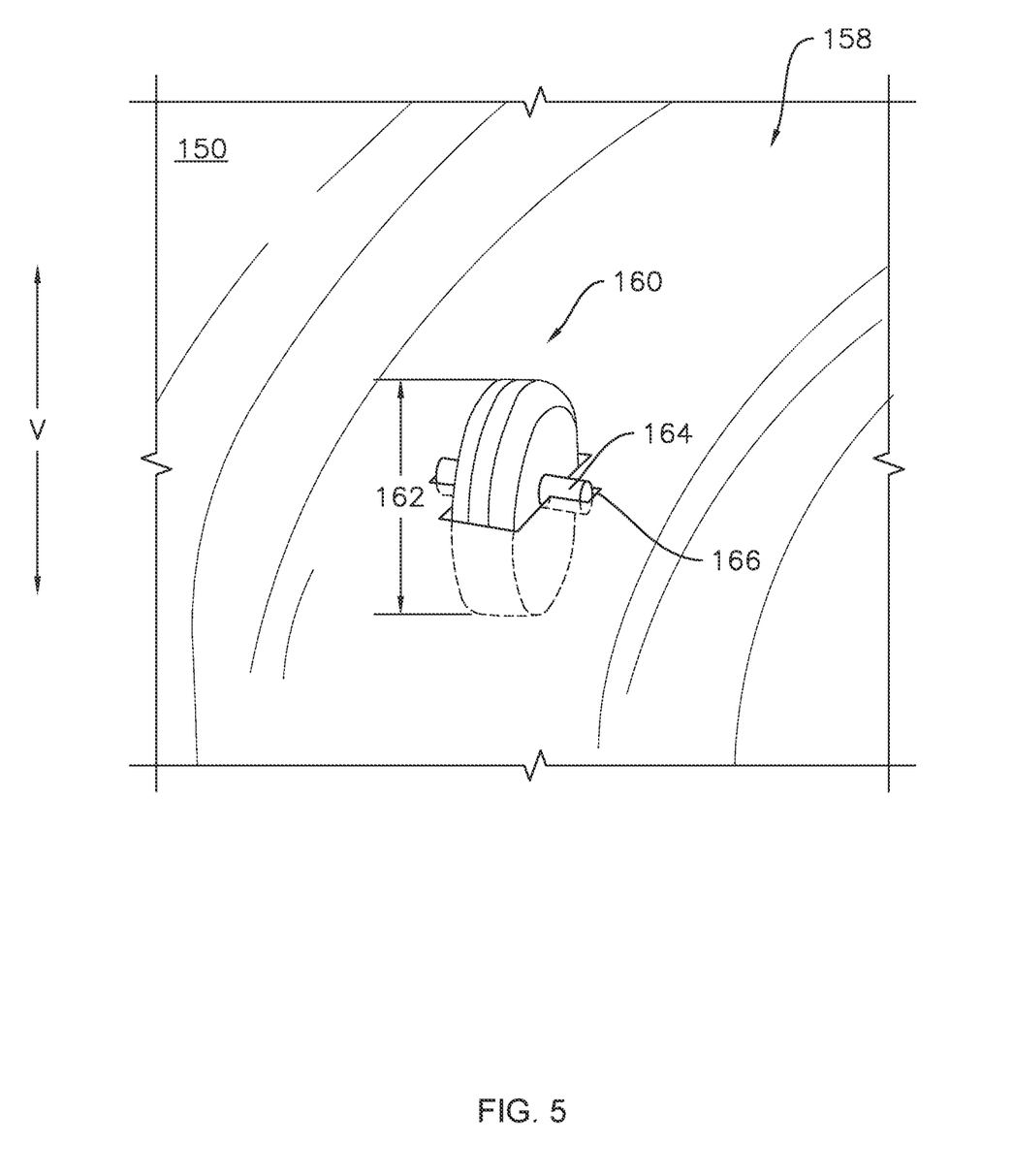
FIG. 5 provides a close-up view of portions of the exemplary cooking appliance of FIG. 4.

Turning now to FIGS. 4 and 5, in some embodiments a trench 158 may be defined in the bottom wall 150 and a plurality of wheels 160 may be mounted to the bottom wall 150, e.g., within the trench 158. The trench 158 may encircle and define a central portion 151 of the bottom wall 150. The central portion 151 of the bottom wall 150 may, in some embodiments, be lower than surrounding portions of the bottom wall 150 outside of the trench 158, e.g., the central portion 151 of the bottom wall 150 may be below the surrounding portions of the bottom wall 150 along the vertical direction V.

As illustrated in FIG. 5, each wheel 160 of the plurality of wheels 160 may be mounted in a recess or receptacle 166 in the bottom wall 150, e.g., within the trench 158 defined in the bottom wall 150. In some embodiments, each wheel 160 may be received within a receptacle 166 defined in and extending down from the trench 158. Each wheel 160 may be mounted on an axle 164 whereby the wheel 160 rotates around a pivot axis defined by the axle 164 through the center of the wheel 160 and the axle 164, as is understood by those of ordinary skill in the art. Also as may be seen in FIG. 5, in some embodiments each wheel 160 of the plurality of wheels 160 may define a diameter 162, e.g., along the vertical direction V. In such embodiments, each wheel 160 of the plurality of wheels 160 may be mounted to the bottom wall 150, e.g., within a respective receptacle 166 in the trench 158, such that each wheel 160 is positioned with a first portion of the diameter 162 of each wheel 160 extending above the bottom wall 150, e.g., above the bottom of the trench 158, along the vertical direction V and a second portion of the diameter 162 of each wheel 160 extending below the bottom wall 150 along the vertical direction V. For example, in some embodiments, each wheel 160 may be mounted in each respective receptacle 166 such that one half of the wheel 160 extends above the bottom wall 150, e.g., out of and above the receptacle 166, and the other half of the wheel 160 extends below the bottom wall 150, e.g., within the receptacle 166.

Thus, when the turntable 152 is installed, an upper surface of the turntable 152 may be generally flush (e.g., spaced apart by no more than ten percent of the vertical dimension of the turntable 152) with the immediately adjacent portion of the bottom wall 150 along the vertical direction V, where the immediately adjacent portion may be a ridge which defines a boundary of the trench 158 and also defines a transition between the trench 158 and surrounding flat portions of the bottom wall 150. For example, a bottom surface 153 (see, e.g., FIG. 8) of the turntable 152 may rest on top of the plurality of wheels 160 when the turntable 152 is installed. Also by way of example, the turntable 152 may be spaced apart from the bottom wall 150, e.g., the trench 158 therein and the central portion 151 thereof, along the vertical direction V by the plurality of wheels 160, such as by the portion of each wheel 160 that extends above the bottom wall 150. As a result, the turntable 152 may be rotatable within the cooking chamber 104 without friction at an interface with the bottom wall 150 or dragging along the bottom wall 150 of the cooking chamber 104 when the turntable 152 is rotated by the motor 154, e.g., via the drive shaft 156 and non-magnetic rotation hub 170, as will be described in more detail below.

Figure 6:
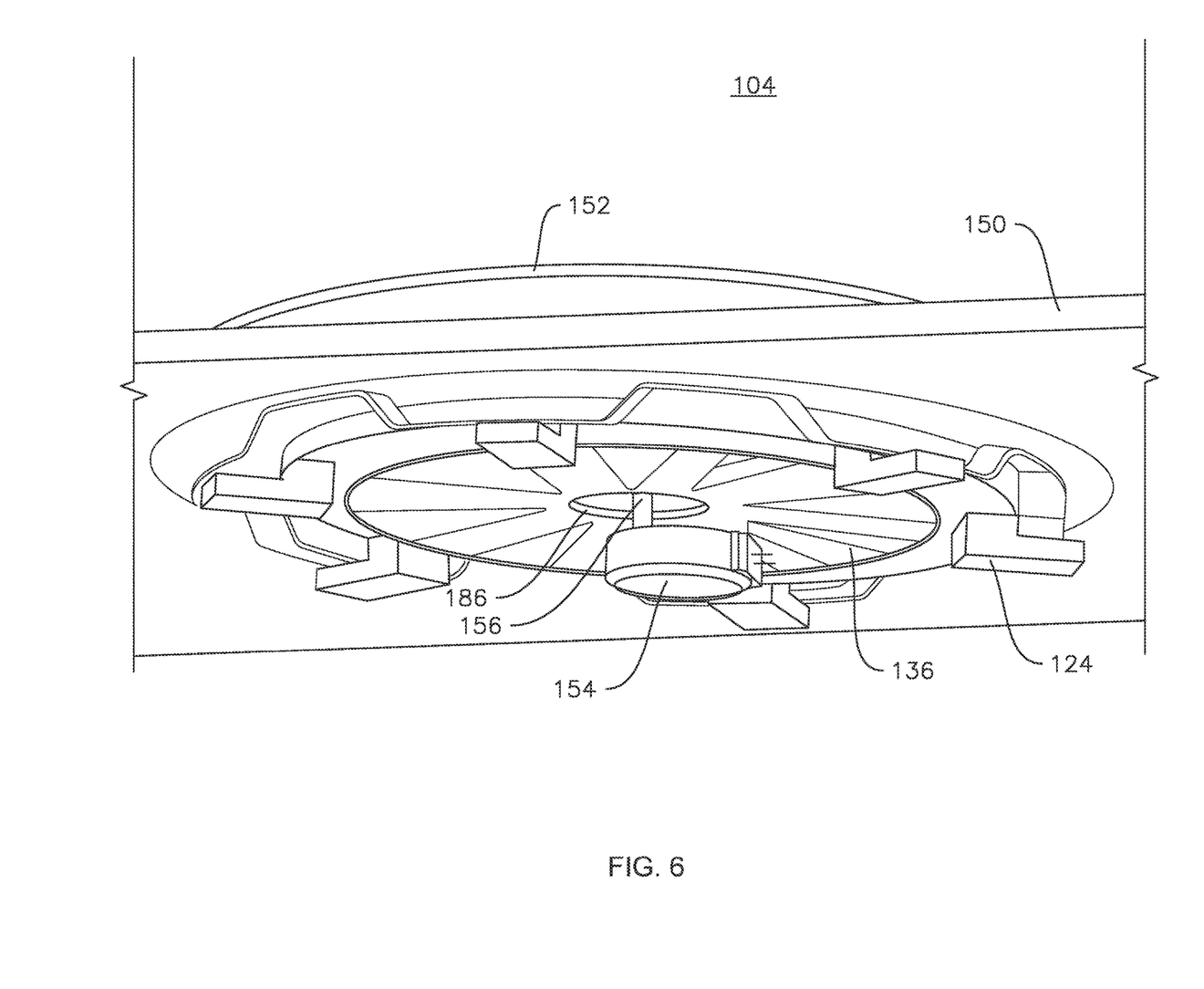
FIG. 6 provides a perspective view of components of the exemplary cooking appliance of FIG. 2 positioned below the cooking chamber.

As may be seen throughout the accompanying illustrations, e.g., in FIGS. 6 and 7, in some embodiments, the turntable 152 may be rotatably mounted in the cooking chamber 104 above the induction heating coil 136 along the vertical direction V, while the motor 154 may be mounted within the cabinet 102 outside of the cooking chamber 104, such that the motor 154 is below and adjacent to the induction heating coil 136, e.g., the turntable 152 and the motor 154 may be positioned on opposite sides of the induction coil 136, such as with the turntable 152 above the induction coil 136 and the motor 154 below the induction coil 136. Thus, the coupling between the motor 154 and the turntable 152 may extend through the induction coil 136 in such embodiments. The non-magnetic rotation hub 170 thus advantageously couples the motor 154 and drive shaft 156 to the turntable 152 through the induction coil 136 without creating magnetic interference during operation of the induction coil 136. For example, the non-magnetic rotation hub 170 may extend through an aperture 168 in the bottom wall 150 of the cooking chamber 104 and through an aperture 186 in the induction coil 136, with the drive shaft 156 received within the rotation hub 170, e.g., within the portion of the rotation hub 170 that extends through the aperture 186 in the induction coil 136.

Figure 8:
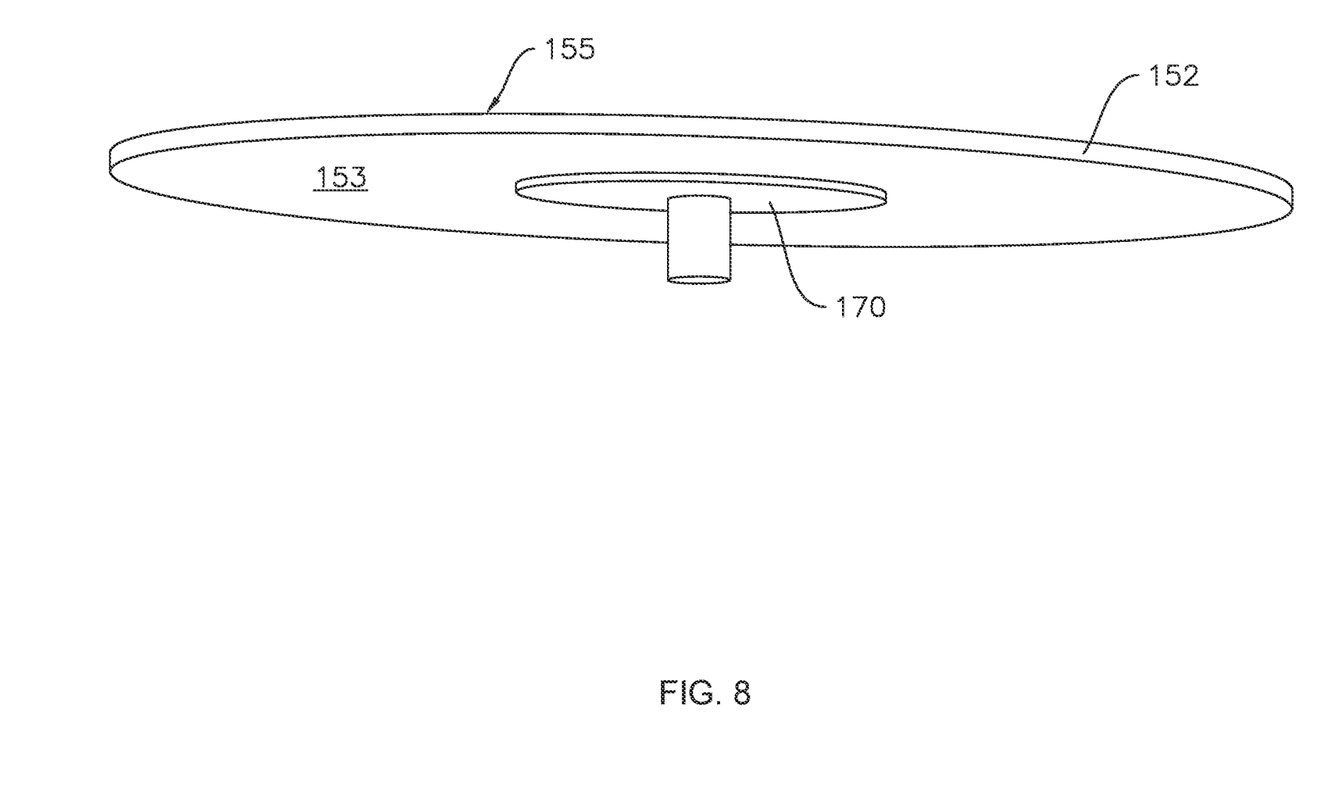
FIG. 8 provides a perspective view of the removable turntable of FIG. 7.

The turntable 152 may comprise any suitable material or combination of materials. For example, in some embodiments, the turntable 152 may comprise a glass material, a plastic material, or combinations thereof. The rotation hub 170 may be bonded to a bottom surface 153 of the turntable 152, e.g., as illustrated in FIG. 8. The non-magnetic rotation hub 170 may comprise any suitable material as will be understood by those of ordinary skill in the art, where such material is robust to the forces imparted during rotation of the turntable 152 by the motor 154 and such material does not interact with or disrupt the magnetic field from the induction coil 136 to a sufficient extent as to reduce the efficiency of the induction coil 136 when heating a cooking vessel, such as any material which does not reduce the efficiency of the induction coil 136 by more than ten percent. For example, the non-magnetic rotation hub 170 may comprise a metallic material such as non-magnetic stainless steel material, an aluminum material, or any other suitable material, including combinations thereof.

Figure 9:
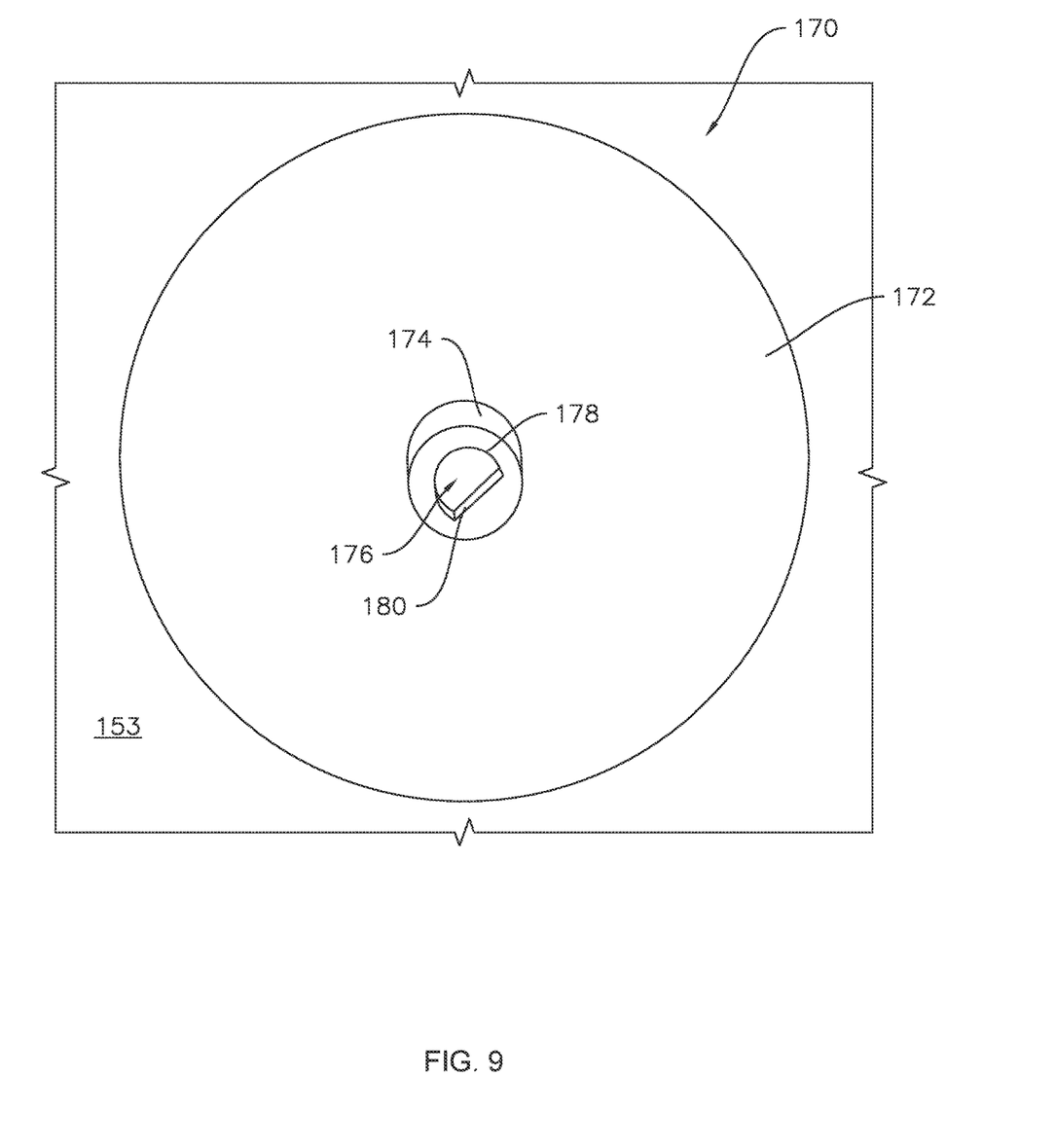
FIG. 9 provides an enlarged view of a portion of the removable turntable.

Turning now to FIG. 9, the non-magnetic rotation hub 170 may include a mounting flange 172 which is in contact with and mounted to the turntable 152, such as mounted to the bottom surface 153 of the turntable 152, as described above. The non-magnetic rotation hub 170 may also include a connecting shaft 174 which extends from the mounting flange 172, such as along a longitudinal axis that is generally perpendicular to a major dimension, e.g., diameter, of the mounting flange 172. For example, the connecting shaft 174 may extend downward along the vertical direction V from the mounting flange 172 when the turntable 152 is installed in the cooking chamber 104, e.g., whereby the connecting shaft 174 extends through the apertures 168 and 186 and extends between the turntable 152 and the motor 154.

A channel 176 may be formed in the connecting shaft 174 for receipt of the drive shaft 156. In some embodiments, the channel 176 may be prismatic, such that the turntable 152 is removably coupled to the motor 154 via the connecting shaft 174 (and the channel 176 therein) of the non-magnetic rotation hub 170. For example, the channel 176 may have a constant cross-section, without any latch, notch, groove, or other retaining or locking features therein, such that the drive shaft 156 is removable from the channel 176. Such removable coupling of the turntable 152 to the motor 154 may be advantageous, for example, for cleaning the turntable 152.

In order to promote transfer of rotational motion from the drive shaft 156 (rotated by the motor 154) to the rotation hub 170 and thus to the turntable 152 via the rotation hub 170, the channel 176 may include a rounded portion 178, e.g., that describes a circular arc in cross-section, and a flat portion 180 which engages a corresponding flat portion on the drive shaft 156 to prevent or limit relative rotation of the drive shaft 156 relative to the rotation hub 170, e.g., so that the drive shaft 156 is prevented or inhibited from freely spinning within the connecting shaft 174, thereby transferring rotation of the drive shaft 156 to the rotation hub 170 and thus to the turntable 152 via the rotation hub 170.

In certain embodiments, a one-way field filter 182 is provided between induction heating coil 136 and cooking chamber 104. For instance, one-way field filter 182 may be mounted or disposed above the induction heating coil 136, e.g., between the induction heating coil 136 and the cooking chamber 104. For example, the turntable 152 and the non-magnetic rotation hub 170 mounted thereto may be positioned above the one-way field filter 182 within cooking chamber 104. The filter 182 may permit the magnetic field from the induction coil 136 to pass therethrough into the cooking chamber 104 while preventing or restricting microwave energy passing through the filter 182 to the induction coil 136. One-way field filter 182 may limit or restrict passage of microwave radiation or microwaves while significantly and advantageously permitting the magnetic field. The magnetic field generated by induction heating coil 136 may thus be forced to pass through one-way field filter 182 before entering cooking chamber 104. Advantageously, the one-way field filter 182 may permit magnetic field to pass (e.g., upward) therethrough to cooking chamber 104 while simultaneously preventing passage of microwaves (e.g., downward) therethrough from cooking chamber 104 to induction heating coil 136.

In some embodiments, the mounting flange 172 of the rotation hub 170 may define a diameter greater than a diameter of the aperture 168 in the bottom wall 150 of the cooking chamber 104. In such embodiments, the filter 182 may also include an aperture of about the same diameter as the aperture 168, e.g., within ten percent greater or less than the diameter of aperture 168. Thus, when the mounting flange 172 has a greater diameter than each of the aperture 168 and the aperture in filter 182, the mounting flange 172 may obstruct the microwave directed by the magnetron 122 into the cooking chamber 104 from exiting the cooking chamber 104 via the aperture 168 in the bottom wall 150 of the cooking chamber 104 and/or via the aperture in the filter 182.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooking appliance defining a vertical direction, a lateral direction, and a transverse direction, the vertical, lateral, and transverse directions being mutually perpendicular, the cooking appliance comprising:
   a cabinet defining a cooking chamber;
   a magnetron mounted within the cabinet in communication with the cooking chamber to direct a microwave thereto;
   an induction heating coil mounted within the cabinet below the cooking chamber along the vertical direction, the induction heating coil in communication with the cooking chamber to direct a magnetic field thereto;
   a turntable rotatably mounted in the cooking chamber above the induction heating coil along the vertical direction with an upper surface of the turntable generally flush with an immediately adjacent portion of a bottom wall of the cooking chamber; and
   a motor operatively coupled to the turntable, the motor mounted within the cabinet outside of the cooking chamber below and adjacent to the induction heating coil,
   wherein the motor is operatively coupled to the turntable by a non-magnetic rotation hub extending through the induction heating coil, wherein the rotation hub comprises a mounting flange and a connecting shaft, the connecting shaft extending through the induction heating coil via an aperture in the induction heating coil, the mounting flange positioned above and extending around the aperture, whereby the mounting flange obstructs the microwave directed by the magnetron from exiting the cooking chamber via the aperture.

2. The cooking appliance of claim 1, wherein the turntable comprises a glass material and the rotation hub comprises a non-magnetic metal material bonded to a bottom surface of the turntable.

3. The cooking appliance of claim 1, further comprising a plurality of wheels mounted to the bottom wall of the cooking chamber.

4. The cooking appliance of claim 3, wherein each wheel of the plurality of wheels defines a diameter, and wherein each wheel of the plurality of wheels is mounted to the bottom wall of the cooking chamber with a first portion of the diameter of each wheel extending above the bottom wall along the vertical direction and a second portion of the diameter of each wheel extending below the bottom wall along the vertical direction.

5. The cooking appliance of claim 3, wherein a bottom surface of the turntable rests on top of the plurality of wheels and wherein the turntable is spaced apart from the bottom wall of the cooking chamber along the vertical direction by the plurality of wheels.

6. The cooking appliance of claim 1, wherein the turntable is removably coupled to the motor.

7. The cooking appliance of claim 1, wherein the motor is directly coupled to a drive shaft whereby the motor rotates the drive shaft when the motor is activated, and the motor is coupled to the rotation hub via the drive shaft.

8. The cooking appliance of claim 1, wherein the rotation hub comprises a non-magnetic stainless steel material.

9. The cooking appliance of claim 1, wherein the rotation hub comprises an aluminum material.

10. A cooking appliance comprising:
a cabinet defining a cooking chamber;
a magnetron mounted within the cabinet in communication with the cooking chamber to direct a microwave thereto;
an induction heating coil mounted within the cabinet in communication with the cooking chamber to direct a magnetic field thereto;
a turntable rotatably mounted in the cooking chamber adjacent to the induction heating coil with an upper surface of the turntable generally flush with an immediately adjacent portion of a bottom wall of the cooking chamber; and
a motor operatively coupled to the turntable mounted within the cabinet outside of the cooking chamber adjacent to the induction heating coil on an opposite side of the induction heating coil from the turntable,
wherein the motor is operatively coupled to the turntable by a non-magnetic rotation hub extending through the induction heating coil, wherein the rotation hub comprises a mounting flange and a connecting shaft, the connecting shaft extending through the induction heating coil via an aperture in the induction heating coil, the mounting flange positioned above and extending around the aperture, whereby the mounting flange obstructs the microwave directed by the magnetron from exiting the cooking chamber via the aperture.

11. The cooking appliance of claim 10, wherein the turntable comprises a glass material and the rotation hub comprises a non-magnetic metal material bonded to a bottom surface of the turntable.

12. The cooking appliance of claim 10, further comprising a plurality of wheels mounted to the bottom wall of the cooking chamber.

13. The cooking appliance of claim 12, wherein each wheel of the plurality of wheels defines a diameter, and wherein each wheel of the plurality of wheels is mounted to the bottom wall of the cooking chamber with a first portion of the diameter of each wheel extending above the bottom wall and a second portion of the diameter of each wheel extending below the bottom wall.

14. The cooking appliance of claim 12, wherein a bottom surface of the turntable rests on top of the plurality of wheels and wherein the turntable is spaced apart from the bottom wall of the cooking chamber by the plurality of wheels.

15. The cooking appliance of claim 10, wherein the turntable is removably coupled to the motor.

16. The cooking appliance of claim 10, wherein the motor is directly coupled to a drive shaft whereby the motor rotates the drive shaft when the motor is activated, and the motor is coupled to the rotation hub via the drive shaft.

17. The cooking appliance of claim 10, wherein the rotation hub comprises a non-magnetic stainless steel material.

18. The cooking appliance of claim 10, wherein the rotation hub comprises an aluminum material.

* * * * *